No. 827,427. PATENTED JULY 31, 1906.
R. W. DAVIES.
WIRE GLASS MACHINE.
APPLICATION FILED OCT. 10, 1905.

3 SHEETS—SHEET 1.

WITNESSES.

INVENTOR.

No. 827,427. PATENTED JULY 31, 1906.
R. W. DAVIES.
WIRE GLASS MACHINE.
APPLICATION FILED OCT. 10, 1905.

3 SHEETS—SHEET 2.

WITNESSES.
INVENTOR.

No. 827,427. PATENTED JULY 31, 1906.
R. W. DAVIES.
WIRE GLASS MACHINE.
APPLICATION FILED OCT. 10, 1905.

3 SHEETS—SHEET 3.

WITNESSES.  INVENTOR.

UNITED STATES PATENT OFFICE.

RODERICK W. DAVIES, OF AVONMORE, PENNSYLVANIA, ASSIGNOR TO SERGEANT GLASS COMPANY, OF WILLIAMSPORT, PENNSYLVANIA, A CORPORATION OF PENNSYLVANIA.

WIRE-GLASS MACHINE.

No. 827,427.   Specification of Letters Patent.   Patented July 31, 1906.

Application filed October 10, 1905. Serial No. 282,182.

*To all whom it may concern:*

Be it known that I, RODERICK W. DAVIES, a resident of Avonmore, in the county of Westmoreland and State of Pennsylvania, have invented a new and useful Improvement in Wire-Glass Machines; and I do hereby declare the following to be a full, clear, and exact description thereof.

My invention relates to a machine for making rolled sheet-glass—such as plate-glass, ribbed glass, prism-glass, wire-glass, and the like.

The object of the invention is to provide a machine whereby glass of the character named can be made with greater expedition, in larger quantities per day, and at cheaper cost than with existing machines.

The invention consists, generally stated, in a machine having a plurality or series of tables upon which the glass is formed by means of a roller or rollers, together with a carrier for said tables arranged to bring the same in succession underneath said rollers to form the glass.

The invention also consists in an arrangement for guiding the table in a straight line while passing underneath the roller, in an arrangement for applying a wire mesh or trellis under tension, and in other details of construction and arrangement which will be hereinafter described and claimed.

Figure 1:
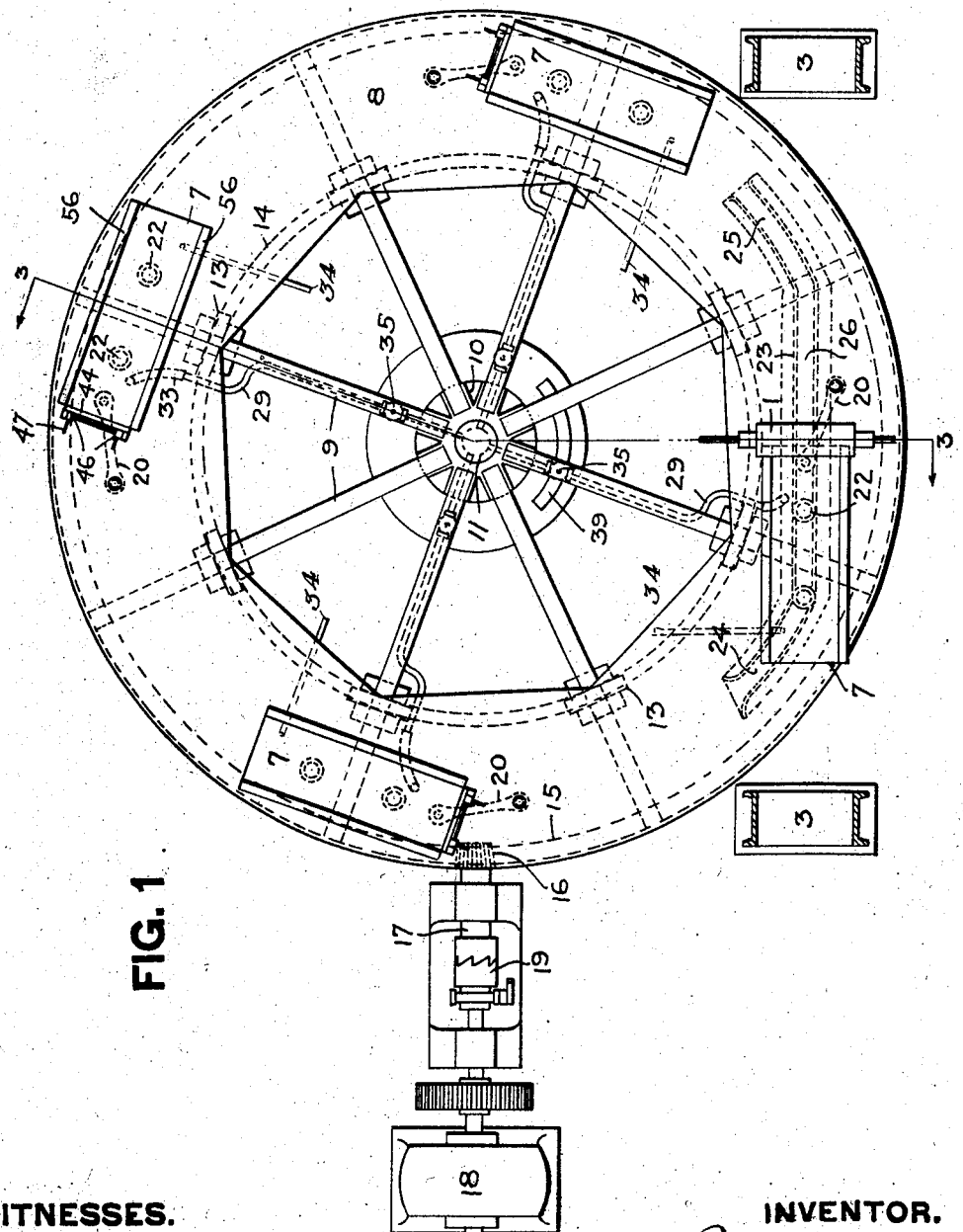
Figure 2:
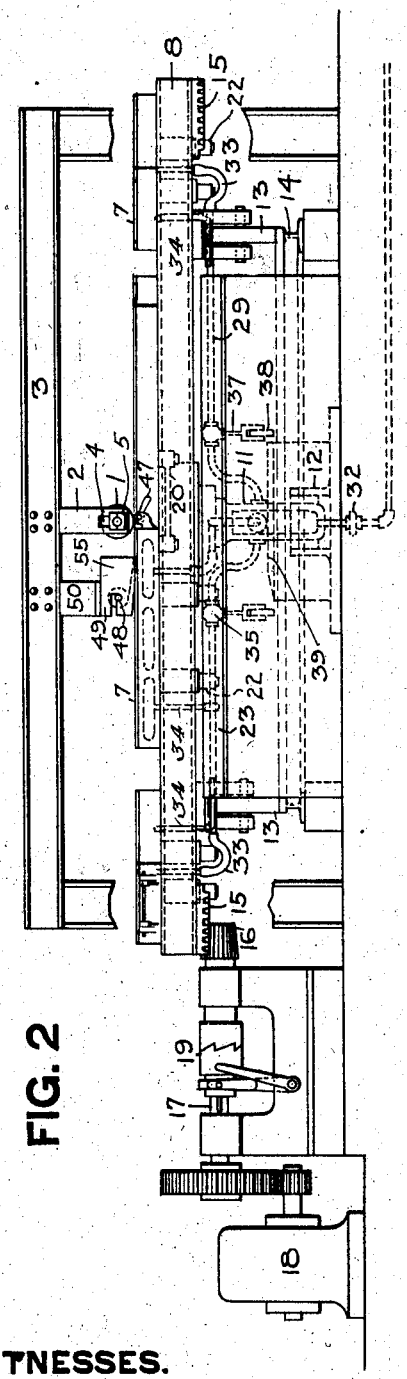
Figure 3:
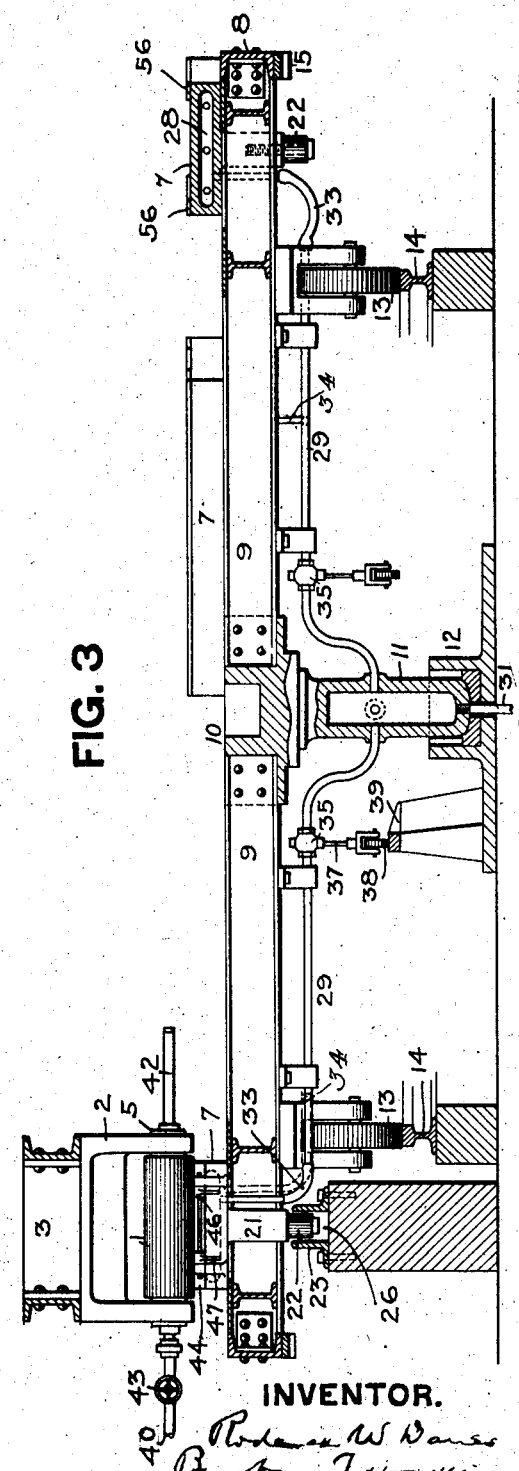
Figure 4:
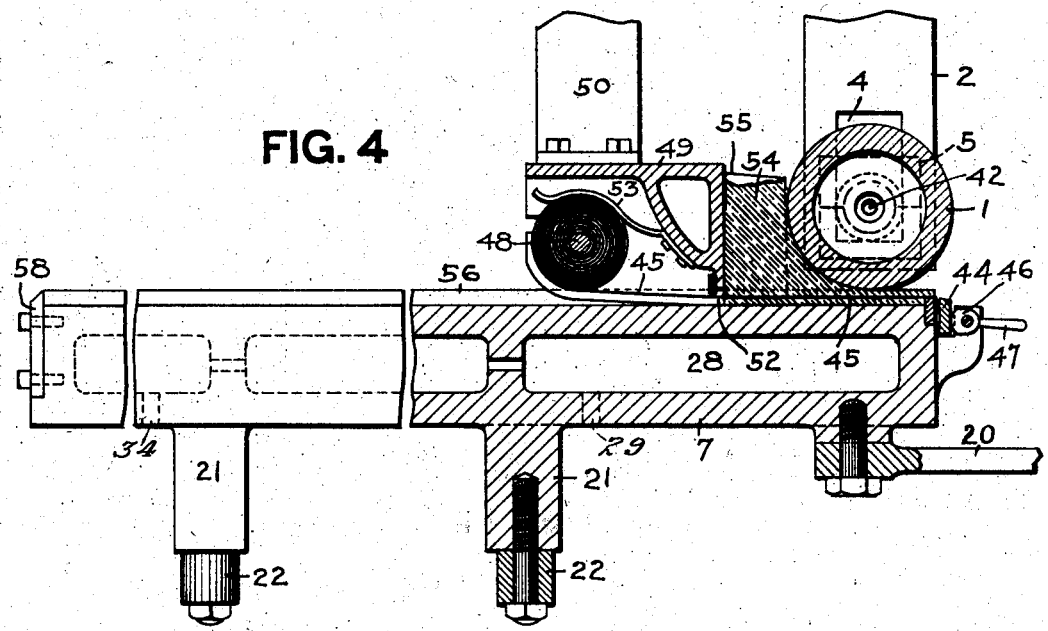
Figures 5, 6:
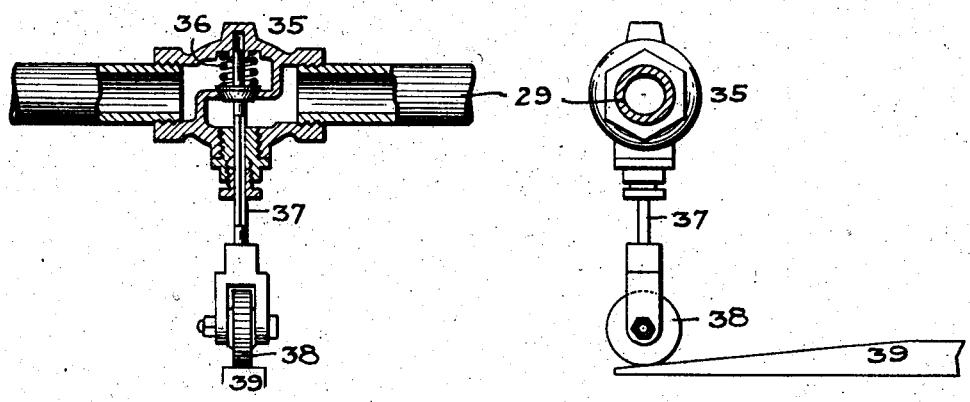
Figure 7:
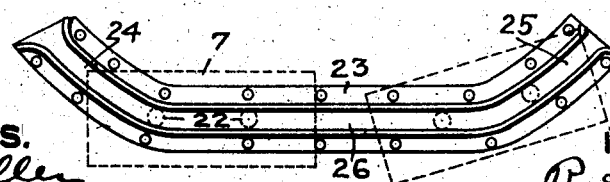

In the accompanying drawings, Figure 1 is a plan view of my improved machine. Fig. 2 is a side elevation of the same. Fig. 3 is a vertical section on the line 3 3, Fig. 1. Fig. 4 is a vertical section, on an enlarged scale, through the table, roller, and wire-trellis-applying device. Fig. 5 is a sectional view of the water-valve employed. Fig. 6 is a view taken at right angles to Fig. 5, showing the cam for actuating the valve; and Fig. 7 is a diagrammatic plan view of the guides for giving the straight movement to the tables when passing underneath the roller.

The present embodiment of my invention includes a stationary roller or rollers and movable tables. The roller is shown at 1, mounted in suitable hangers 2, supported from overhead beams or frame 3. The hangers 2 are slotted, as at 4, in which slots are placed the boxes 5 for the roll-journals. The slots 4 permit the roller to rise and fall, it being held down to its work by its own weight.

Coöperating with the roller are the series of tables 7, the drawings showing four; but obviously the number may be increased or diminished, as desired. These tables are mounted upon a suitable carrier, so as to be carried in succession underneath the roller 1. The carrier shown comprises a circular rotary platform 8, suitably constructed of beams and plates. This platform has a number of radial arms or beams 9, connected to a suitable hub 10, which is provided with a central post 11, mounted in a stepped bearing 12. At intervals the frame is provided with wheels 13, which run on a circular track 14. Connected to or formed on the platform is an annular rack 15, which is engaged by a pinion 16 on a driving-shaft 17, mounted in suitable bearings and driven from any suitable source of power, such as the electric motor 18. Obviously, however, the platform 8 may be driven in any other suitable manner. The driving mechanism includes a suitable clutch 19, by means of which the platform can be stopped and started at will.

The tables 7 are loosely mounted on the platform 8, but are connected thereto so as to move therewith, but so as to permit the tables to swing on the platform. Various means for connecting the tables to the platform may be employed, the drawings showing a link 20, having one end hinged to the table and its opposite end hinged to the platform.

The tables travel around in a circular direction with the platform; but it is necessary when passing underneath the roller that they move in a straight line, so that the roller will have a straight travel over the table and form perfect glass. It is for this reason that the tables are radially movable on the platform and connected thereto by the link 20. To guide the tables in a straight line underneath the roller, said tables are provided on their lower faces with a projecting frame 21, carrying a pair of antifriction-rollers 22, arranged on vertical axes. Underneath the roller 1 is a suitable stationary guide or track 23, which is adapted to be engaged by the rollers 22. As shown, this guide is provided with curved end portions 24 and 25 and a straight portion 26, the latter being of sufficient length to guide the tables in a straight line during their entire traverse underneath the roller 1. The curved end portion 24 of the guide directs the rollers 22 into the straight portion of the guide and swings the table into proper position for passing underneath the roller, while the exit end 25 of said guide swings the table back to its normal position on the platform.

In order to keep the tables from overheating, they are each made hollow, as shown at 28, and each is connected, by means of a pipe 29, to the central post 11, which is made hollow, as shown in Fig. 3, and has connected to its lower end the inlet-pipe 31, which is provided with a swivel connection 32, thus permitting the post 11 to revolve and maintain a tight water connection. The pipes 29 are provided with flexible sections 33, which allow of the lateral or radial movement of the tables 7. Each table is also provided with a suitable outlet-pipe 34, whose discharge end is located inside of the track 14, the floor being provided with a suitable gutter. (Not shown.) By the pipe arrangement shown all of the tables of the series are provided with cooling-water from a single inlet-pipe.

It is preferable to maintain the water in the tables 7 only during the period that the molten glass is being worked. Consequently the pipes 29 are provided with suitable valves 35, which are so arranged as to close automatically, such as being provided with springs 36, which normally hold the valves to their seats. The valve-stems 37 project down through stuffing-boxes and at their lower ends carry rollers 38, which are adapted to run over a cam-bar 39, located in proper position, so that the valve will be opened before the table reaches the roller 1 and will be closed after the table has passed the roller 1.

The roller 1 likewise is hollow and has a water-inlet 40 through one journal and an outlet 42 through the other journal, the inlet being provided with a suitable cut-off valve, as indicated at 43.

The machine so far described is adapted for making practically all kinds of rolled sheet-glass—such as plate-glass, ribbed glass, prism-glass, and the like. In order to make the latter, either the table or the roller 1, or both, will be provided with suitably-shaped face to give the desired ribbing or contour to the glass. For making wire-glass I provide means for embedding the trellis in the glass simultaneously with the rolling thereof. To do this, the forward end of each of the tables is provided with a clamping-bar 44 for securing the end of the trellis 45. This clamping-bar may be operated by any suitable means, such as the cams 46, provided with operating-handles 47. The trellis is carried on a suitable spool or axle 48, which is mounted in a box 49, secured to hangers 50, depending from the frame 3, so that the spool of the trellis is stationary with reference to the roller 1. The box 49 at its forward lower edge is provided with a sliding bar 52, under which the trellis passes and which bar serves as a gage or spacing member to hold the trellis the desired distance above the table 7.

To keep the trellis under tension, I provide a suitable tension device, which may be a weighted brake bearing on the spool 48 or a spring or any other suitable means, the drawings showing a spring 53, secured in the box 49 and bearing upon the roller of the trellis. This spring will be sufficiently stiff to keep the trellis perfectly tight during the rolling operation. The batch of glass 54 will be poured in between the box 49 and the roller 1. A suitable gun 55 is provided to confine a batch. The sides of the table are provided with suitable strips or bars 56, upon which the roller 1 rests, these bars determining the thickness of the sheet of glass. In order to make sheets of various thicknesses, these bars are removable, as is the ordinary practice. The rear end of the table is provided with a knife 58, which will cut off the trellis when the roller passes over the edge of said knife.

The operation of the machine is as follows: The tables 7 are carried around by the platform 8, and when they approach the roller 1 the rollers 22 enter the cam-guide 24, thus swinging the tables around until their longitudinal axes are at right angles to the axis of the roller 1. In this position the platform may be stopped, so as to permit the batch of glass to be poured onto the table in front of the roller 1, or the batch of glass may be poured onto the table without stopping the platform. The table is then carried in a straight line underneath the roller 1, the latter serving to roll down the batch of glass on the table in well-understood manner. By the time the rear end of the table is free from the roller 1 the cam-groove 25 will again swing the table to its normal position on the carrier. The table will then be carried around with the carrier and can have the glass removed therefrom at any suitable point. By having a series of tables the rolling on one table may progress simultaneously with the removal of glass from another table, thus increasing the output of the machine. About the time that the table is brought into position to receive the batch of glass the spring-valve 35 will be opened by reason of the roller 38 running onto the cam-bar 39, thus admitting the cooling medium to the table. After the table has passed from underneath the roller 1 the roller 38 will run off the end of the cam-bar 39, thus permitting the valve 35 to be seated by its spring.

The above mode of operation takes place when forming all kinds of rolled glass. For making plate-glass the table and roller 1 will be provided with smooth faces. For making ribbed glass or prism-glass one or both of said members will be suitably ribbed or shaped. For making wire-glass the box 49 for containing the wire trellis is placed in front of the roller 1. The mode of operation, however, would be the same as when making ordinary glass, it, however, being necessary in this case to stop the table in front of the roller 1, clamp the end of the trellis by means of the bar 44, pour the batch of glass onto the table, and then start the same to carry it underneath the roller 1. The trellis will be held under tension during the operation of embedding the same in the glass. The glass will pass down through the meshes of the trellis, and the latter will be embedded substantially at the center of the sheet. As the rear end of the table passes underneath the box 49 the sliding bar 52 can be raised to bring its base in line with the knife 58 and acting with that knife will cut off the trellis, leaving the end thereof in condition to be clamped to the next succeeding table.

The machine described is simple in construction and operation. By means of the same the tables can be carried underneath the roller 1 in quick succession, so that there will be practically a continuous rolling of glass and as a consequence the output will be very greatly increased.

What I claim is—

1. In a machine for making rolled glass, the combination of a series of tables upon which the glass is rolled, a roller for forming the glass on said tables, and a carrier for said series of tables arranged to carry the same in an endless path and successively underneath said roller, said path being in the main curved but having that portion underneath the roller a straight line.

2. In a machine for making rolled glass, the combination of a plurality of tables upon which the glass is rolled, a roller for forming the glass on said tables, an endless carrier for said tables arranged to carry the same in an endless path said path being curved for its major portion, and successively underneath the roller, and means for guiding said tables in a straight line when passing underneath the roller.

3. In a machine for making rolled glass, the combination of a plurality of tables upon which the glass is rolled, a roller for forming the glass on said tables, an endless carrier on which said tables are mounted to swing and arranged to carry said tables in succession underneath said roller, and means arranged to guide the tables in a straight line while passing underneath said roller.

4. In a machine for making rolled glass, the combination of a plurality of tables upon which the glass is rolled, a roller for forming the glass on said tables, an endless carrier on which said tables are movably mounted, a flexible pulling member connecting said tables to said carrier, and a stationary guide member arranged to engage the tables and guide the same in a straight line while passing underneath the roller.

5. In a machine for making rolled glass, the combination of a plurality of tables upon which the glass is to be rolled, a pressure-roller for forming the glass on said tables, a rotating platform carrying said tables, and means for guiding said tables in a straight line underneath the roller.

6. In a machine for making rolled glass, the combination of a plurality of tables upon which the glass is to be rolled, a pressure-roller for forming the glass on said tables, a rotating platform carrying said tables, said tables being mounted to swing on said platform, and guiding means arranged to carry the tables in a straight line underneath said pressure-roller.

7. In a machine for making rolled glass, the combination of a plurality of tables upon which the glass is to be rolled, a pressure-roller for forming the glass on said tables, a rotating platform upon which said tables are mounted so as to swing thereon, a stationary guide arranged to direct the tables in a straight line underneath the roller, and means on the table contacting with said guide.

8. In a machine for making rolled glass, the combination of a plurality of tables upon which the glass is to be rolled, a pressure-roller for forming the glass on said tables, a rotating platform on which said tables are movably mounted, a flexible pulling member connecting said tables to said platform, and a stationary cam member arranged to engage said tables and guide the same in a straight line underneath the roller.

9. In a machine for making rolled glass, the combination of a plurality of tables upon which the glass is to be rolled, a pressure-roller for forming the glass on said tables, a carrier for said tables arranged to carry the same in succession underneath said roller, said tables being hollow, and connections common to said table for admitting a cooling medium thereto.

10. In a machine for making rolled glass, the combination of a plurality of tables upon which the glass is to be rolled, a pressure-roller for forming the glass on said tables, a circular platform carrying said tables, a pipe arranged centrally of said platform and pipes connecting the same with each of said tables.

11. In a machine for making rolled glass, the combination of a plurality of tables upon which the glass is to be rolled, a pressure-roller for forming the glass on said tables, a platform carrying said tables, a hollow central shaft on which said platform rotates, a pipe connected to said central shaft, and pipes connecting said central shaft with each of said tables.

12. In a machine for making rolled glass, the combination of a plurality of tables upon which the glass is to be rolled, a pressure-roller for forming the glass on said tables, a carrier for said tables arranged to carry the same in succession underneath said roller, connections for a cooling medium to each of said tables, an automatically-closing valve in each of said connections, and means arranged to hold said valve open during a portion of the travel of the tables.

13. In a machine for making rolled glass, the combination of a plurality of tables upon which the glass is to be rolled, a pressure-roller for forming the glass on said tables, a rotating platform carrying said tables, connections for a cooling medium to each of said tables, an automatically-opening valve in each of the connections, and a cam-bar arranged to hold said valves open during a portion of the travel of the tables.

14. In a machine for making wire-glass, the combination of a stationary pressure-roller, a table coöperating therewith and traveling underneath said roller, a clamp for securing the trellis to the forward end of the table, a drum or spool for the trellis, means for applying tension thereto, and a guide for the trellis located in front of and spaced from the pressure-roller to allow the batch to be poured between the same and said roller.

15. In a machine for making wire-glass, the combination of a pressure-roller, a traveling table coöperating therewith, means for securing the trellis to the forward end of the table, a box in front of the roller, a carrier for the trellis in said box, and a gage-bar in said box under which the trellis passes, said gage-bar being spaced from the roller to allow a batch to be poured between the same and the roller.

16. In a machine for forming wire-glass, the combination of a pressure-roller, a traveling table coöperating therewith, means for securing the trellis to the forward end of the table, a roll carrying the trellis, a tension device secured thereto, and a knife secured to the rear end of the table.

17. In a machine for making rolled glass, the combination of a plurality of tables upon which the glass is to be rolled, a pressure-roller coöperating with said tables, a carrier for said tables arranged to carry the same in succession underneath said roller, means for securing the end of the trellis to the forward end of said tables, a box in front of said roller carrying a roll of said trellis, and means for applying tension to said trellis.

In testimony whereof I, the said RODERICK W. DAVIES, have hereunto set my hand.

RODERICK W. DAVIES.

Witnesses:
H. F. BANFIELD,
J. M. KREPS.